(12) United States Patent
Seok et al.

(10) Patent No.: US 8,436,970 B2
(45) Date of Patent: May 7, 2013

(54) LIQUID CRYSTAL DISPLAY AND MANUFACTURING METHOD THEREOF

(75) Inventors: Min-Goo Seok, Seoul (KR); Keun Chan Oh, Cheonan-si (KR); Dong-Gi Seong, Seongnam-si (KR); Min-Jae Kim, Suwon-si (KR); Min-Hee Kim, Ansan-si (KR)

(73) Assignee: Samsung Display Co., Ltd. (KR)

( * ) Notice: Subject to any disclaimer, the term of this patent is extended or adjusted under 35 U.S.C. 154(b) by 154 days.

(21) Appl. No.: 13/212,872

(22) Filed: Aug. 18, 2011

(65) Prior Publication Data

US 2012/0249902 A1 Oct. 4, 2012

(30) Foreign Application Priority Data

Apr. 4, 2011 (KR) .................. 10-2011-0030688

(51) Int. Cl.
*G02F 1/1337* (2006.01)
(52) U.S. Cl.
USPC ............ 349/124; 349/129; 349/130; 349/132
(58) Field of Classification Search .................. 349/124, 349/129, 130, 132
See application file for complete search history.

(56) References Cited

U.S. PATENT DOCUMENTS

| | | | | |
|---|---|---|---|---|
| 7,292,303 B2 * | 11/2007 | Song et al. | .................... | 349/141 |
| 7,333,171 B2 * | 2/2008 | Kim et al. | ...................... | 349/144 |
| 7,525,623 B2 * | 4/2009 | Kim et al. | ...................... | 349/129 |
| 8,098,358 B2 * | 1/2012 | Kim et al. | ...................... | 349/141 |
| 8,253,908 B2 * | 8/2012 | Jung et al. | ..................... | 349/141 |
| 2009/0244425 A1 * | 10/2009 | Jung et al. | ........................ | 349/48 |

* cited by examiner

*Primary Examiner* — Mike Qi
(74) *Attorney, Agent, or Firm* — Innovation Counsel LLP

(57) ABSTRACT

Provided is a liquid crystal display including: a first substrate and a second substrate facing each other; a pixel electrode disposed on the first substrate; an opposing electrode disposed on the second substrate; a liquid crystal layer in vertical alignment mode interposed between the first substrate and the second substrate and including a plurality of liquid crystal molecules; and a tilt direction determining member determining tilt directions of the liquid crystal molecules when an electric field is generated in the liquid crystal layer, wherein the liquid crystal layer includes a first area and a second area in each of the first area and the second area, the liquid crystal molecules being aligned to have a pretilt without the electric field in the liquid crystal layer, and a pretilt angle of the liquid crystal molecules in the first area is larger a pretilt angle that of the liquid crystal molecules in the second area.

25 Claims, 14 Drawing Sheets

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2011-0030688 filed in the Korean Intellectual Property Office on Apr. 4, 2011, the entire contents of which are incorporated herein by reference.

BACKGROUND OF THE INVENTION (a) Field of the Invention

The present invention relates to a liquid crystal display and a manufacturing method thereof.

(b) Description of the Related Art

Liquid crystal displays are a widely used type of flat panel display device. Liquid crystal displays include two panels on which field generating electrodes, such as a pixel electrode and an opposing electrode, are formed. A liquid crystal layer is interposed between the two substrates.

In a liquid crystal display, an electric field is generated in the liquid crystal layer by applying voltage to the field generating electrodes. The electric field determines the orientations of the liquid crystal molecules of the liquid crystal layer, which controls the polarization of incident light, thereby displaying an image.

Vertically aligned mode liquid crystal displays are one type of liquid crystal display. In vertically aligned mode liquid crystal displays the long axis of the liquid crystal molecules is arranged to be perpendicular to the upper and lower panels in the state in which an electric field is not applied. Vertical aligned mode liquid crystal displays have received much attention because they have a high contrast ratio, and a large and wide reference viewing angle can be easily achieved.

To achieve a wide viewing angle, vertically aligned mode liquid crystal displays may include a plurality of domains in each pixel that have different alignment directions of the liquid crystal molecules.

In one method for forming the plurality of domains a cutout, such as a slit or the like, is formed in the field generating electrode. As a result of the cutout, the plurality of domains may be formed because the liquid crystal molecules are realigned at a fringe field which is formed between an edge of the cutout and the field generating electrode facing the edge.

To increase response speed of the liquid crystal molecules, an initial alignment method has been proposed that allows the liquid crystal molecule to have a pretilt, in which the liquid crystal molecules are slightly rotated with respect to the field generating electrode when the electric field is not applied. For example, a pretilt of the liquid crystal molecules in a predetermined direction may be achieved by adding a prepolymer material that can be polymerized by heat or light such as ultraviolet to the liquid crystal layer, applying an electric field to the liquid crystal layer, and irradiating the liquid crystal layer with light or heat to polymerize the prepolymer in the pretilt direction.

The above information disclosed in this Background section is only for enhancement of understanding of the background and therefore it may contain information that does not form the prior art that is already known to a person of ordinary skill in the art.

SUMMARY OF THE INVENTION

A liquid crystal display having the advantages of improving response speed of a liquid crystal display without deterioration of a contrast ratio is provided. The liquid crystal display includes: a first substrate and a second substrate facing each other; a pixel electrode disposed on the first substrate; an opposing electrode disposed on the second substrate; a liquid crystal layer in a vertical alignment mode interposed between the first substrate and the second substrate, the liquid crystal layer including a plurality of liquid crystal molecules; and a tilt direction determining member configured to determine tilt directions of the liquid crystal molecules when an electric field is generated in the liquid crystal layer, wherein the liquid crystal layer includes a first area and a second area, in each of the first area and the second area, the liquid crystal molecules being aligned to have a pretilt without the electric field generated in the liquid crystal layer, and a pretilt angle of the liquid crystal molecules in the first area is larger than a pretilt angle of the liquid crystal molecules in the second area. The liquid crystal display may further include a light blocking member disposed on the first substrate or the second substrate and the first area may overlap the light blocking member. The liquid crystal display may further include a signal line disposed on the first substrate and the first area may be formed along the signal line. The signal line may include a data line transmitting a data voltage. A long axis of the liquid crystal molecules in the first area may form an angle of about 10 degrees to about 89.5 degrees with respect to a normal line to surfaces of the first substrate and the second substrate. The tilt direction determining member may include a plurality of minute slits formed in the pixel electrode, and the liquid crystal molecules may be pretilted substantially in an extension direction of the minute slit. The liquid crystal display may further include an alignment layer disposed on at least one of the pixel electrode and the opposing electrode, the tilt direction determining member may include a polymer formed in the alignment layer. The liquid crystal layer may further include a polymer for controlling the liquid crystal molecules to have the pretilt.

In another aspect, a method of manufacturing a liquid crystal display is provided, the method including: forming a first alignment layer on a first substrate; forming a second alignment layer on a second substrate; forming a liquid crystal layer including liquid crystal molecules by injecting a liquid crystal material between the first substrate and the second substrate; and forming a first area and a second area in each of which the liquid crystal molecules of the liquid crystal layer are aligned to have a pretilt, in which a pretilt angle of the liquid crystal molecules in the first area is larger than a pretilt angle of the liquid crystal molecules in the second area. The method may further include forming a light blocking member on the first substrate or the second substrate, and the light blocking member may overlap the first area. The method may further include forming a gate line transmitting a gate signal and a data line transmitting the data voltage on the first substrate; forming a pixel electrode receiving the data voltage in response to the gate signal on the first substrate; and forming an opposing electrode on the second substrate. The forming of the first area and the second area may include: providing a prepolymer to at least one of the liquid crystal layer, the first alignment layer and the second alignment layer, forming the second area by polymerizing the prepolymer while providing a potential difference of a first voltage between the pixel electrode and the opposing electrode; and forming the first area by polymerizing the prepolymer while providing a potential difference of 0V between the pixel electrode and the opposing electrode, and providing a potential difference of a second voltage between the data line and the opposing electrode. The second voltage may be in a range from about 7V to about 30V. The forming of the first area and the second area may include polymerizing the polymer while providing a potential difference of a third voltage applied to the opposing electrode with respect to the pixel electrode, and a potential difference of a fourth voltage applied to the data line with respect to the opposing electrode. An absolute value of the fourth voltage may be larger than an absolute value of the third voltage. The third voltage may be in a range from about 7V to about 15V, and the fourth voltage may be in a range from about −45V to about −17V. The liquid crystal material may further include a prepolymer that can be polymerized by light. A long axis of the liquid crystal molecules in the first area may form an angle of about 10 degrees to about 89.5 degrees with respect to a normal line to surfaces of the first substrate and the second substrate. The prepolymer may be polymerized by irradiation with light. The prepolymer may be polymerized by application of heat.

The liquid crystal molecules of the liquid crystal layer in an area in which the light leakage is covered by the light blocking member are excessively pretilted as compared with the remaining area, such that response speed of the liquid crystal display can be improved without the deterioration of a contrast ratio.

DETAILED DESCRIPTION OF THE EMBODIMENTS

Figure 1:
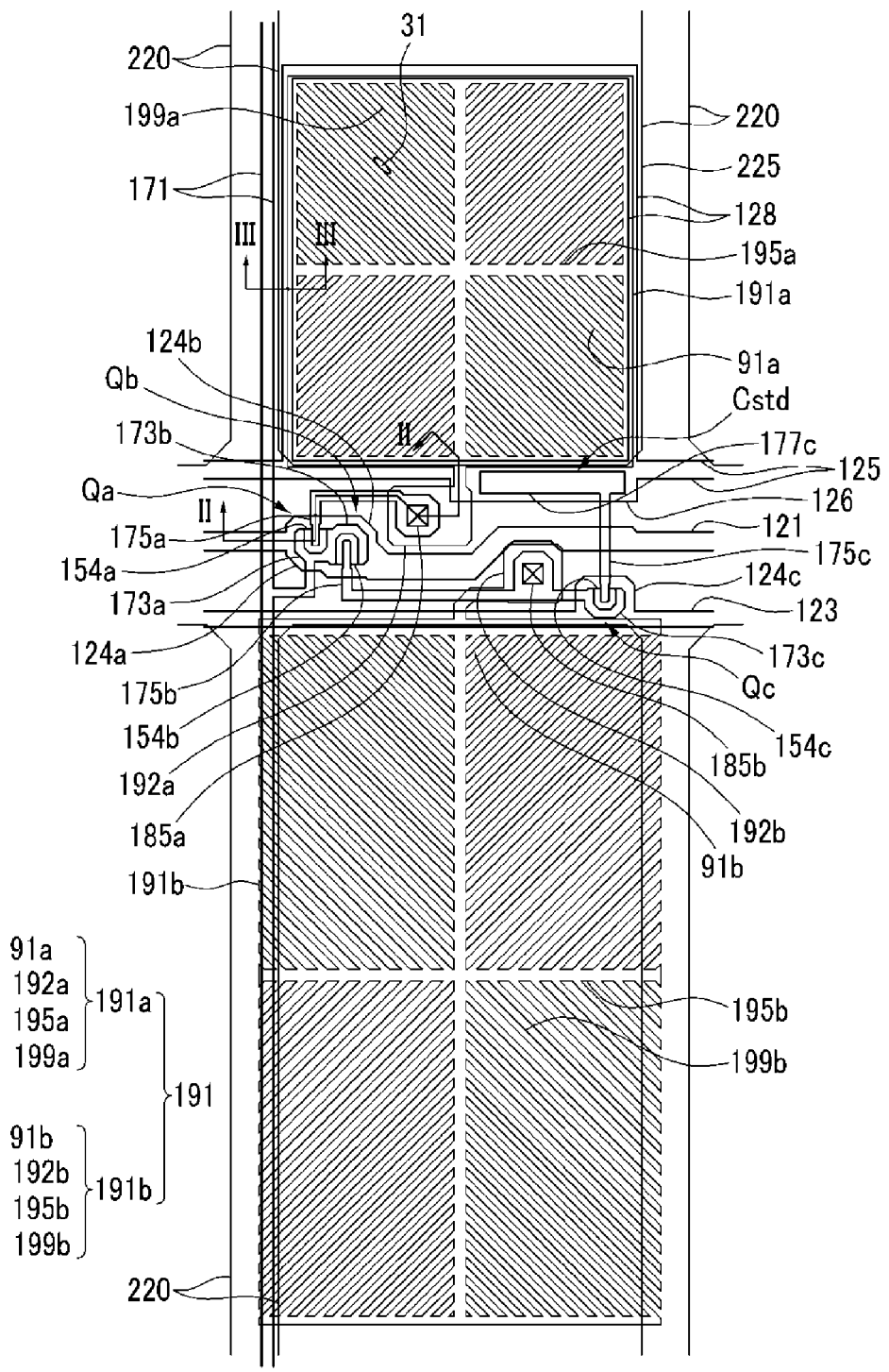
FIG. 1 is a layout view of one pixel of a liquid crystal display according to an exemplary embodiment.

The present disclosure will be described more fully hereinafter with reference to the accompanying drawings, in which exemplary embodiments shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

First, a liquid crystal display according to an exemplary embodiment will be described with reference to FIGS. 1, 2 and 3.

Figure 2:
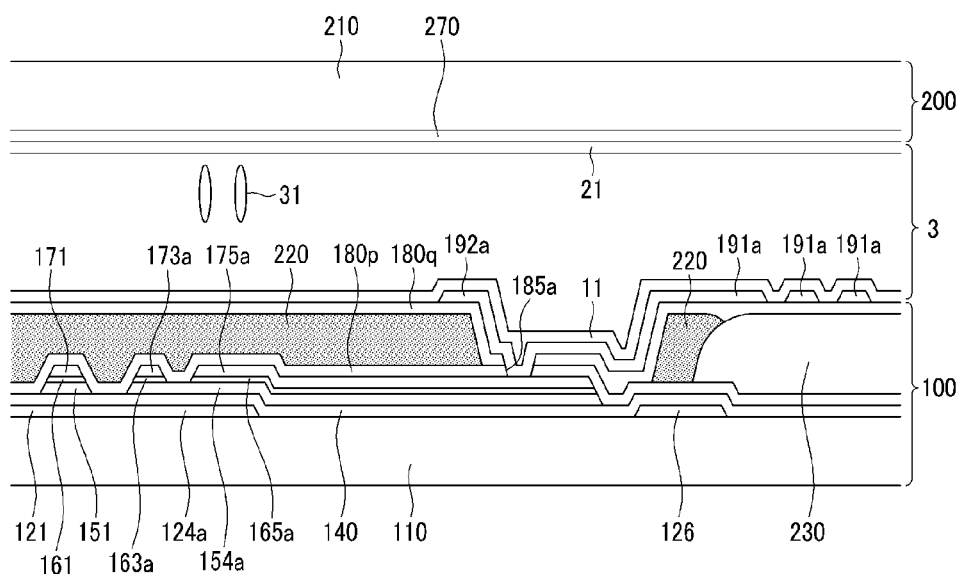
FIGS. 2 and 3 are cross-sectional views of the liquid crystal display of FIG. 1 taken along lines II-II and III-III, respectively.
Figure 3:
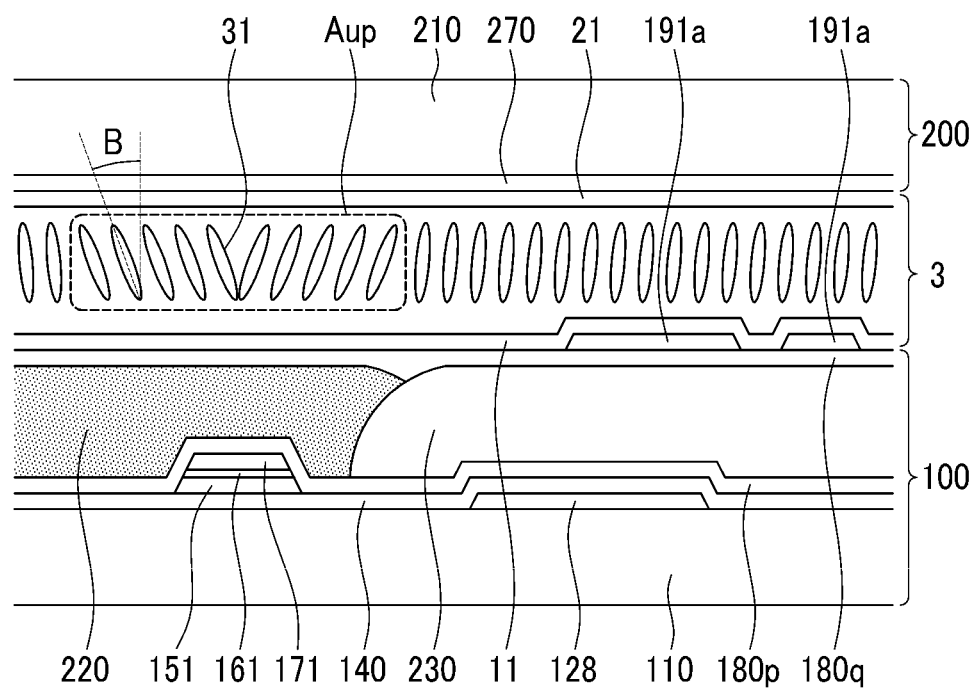

FIG. 1 is a layout view of one pixel of a liquid crystal display according to an exemplary embodiment of the present invention and FIGS. 2 and 3 are cross-sectional views of the liquid crystal display taken along lines II-II and III-III of FIG. 1, respectively.

The liquid crystal display according to the exemplary embodiment includes a lower panel 100 and an upper panel 200 facing the lower panel 100, and a liquid crystal layer 3 interposed between the two panels 100 and 200. A polarizer (not shown) may be provided at outer surfaces of the panels 100 and 200.

First, the upper panel 200 will be described.

An opposing electrode 270 is formed on an insulation substrate 210. The opposing electrode 270 may be made, for example, of a transparent conductor such as ITO, IZO, or the like or metal. A vertical alignment layer 21 may be formed on the opposing electrode 270.

Next, the lower panel 100 will be described.

A plurality of gate conductors including a plurality of gate lines 121, a plurality of down gate lines 123, and a plurality of storage electrode lines 125 are formed on the insulation substrate 110.

The gate line 121 and the down gate line 123 extend in a horizontal direction and respectively transmit a gate signal. The gate line 121 includes a first gate electrode 124a and a second gate electrode 124b that may protrude upwards and downwards from the gate line 121. The down gate line 123 includes a third gate electrode 124c that may protrude upwards from the down gate line 123. The first gate electrode 124a and the second gate electrode 124b may be connected to each other to form one protrusion portion.

The storage electrode line 125 extends in a horizontal direction and transmits a predetermined voltage such as common voltage Vcom or the like. The storage electrode line 125 may include a storage extension portion 126 extending downwards from the storage electrode line 125, and a ring portion 128 extending upwards from the storage electrode line 125.

A gate insulating layer 140 is formed on the gate conductors 121, 123, and 125.

A plurality of linear semiconductors 151 that may be made, for example, of amorphous silicon or crystalline silicon are formed on the gate insulating layer 140. The linear semiconductor 151 extends in a vertical direction and includes first and second semiconductors 154a and 154b, which extend toward the first and second gate electrodes 124a and 124b and are connected to each other, and a third semiconductor 154c connected with the second semiconductor 154b.

A plurality of linear ohmic contacts 161 are formed on the linear semiconductor 151, first ohmic contacts 163a and 165a are formed on the first semiconductor 154a, and a second ohmic contact (not shown) and a third ohmic contact (not shown) are fomed on the second semiconductor 154b and the third semiconductor 154c, respectively. The first ohmic contact 165a may protrude from the linear ohmic contact 161.

A data conductor including a plurality of data lines 171, a plurality of first drain electrodes 175a, a plurality of second drain electrodes 175b, and a plurality of third drain electrodes 175c are formed on the ohmic contacts 161 and 165a.

The data line 171 transmits a data signal, extends in a vertical direction, and crosses the gate line 121 and the down gate line 123. Each data line 171 includes a first source electrode 173a and a second source electrode 173b which extend, respectively, toward the first gate electrode 124a and the second gate electrode 124b. The first drain electrode 175a, the second drain electrode 175b, and the third drain electrode 175c include one bar type end portion and the other end portion is a wide end portion. The bar type end portions of the first drain electrode 175a and the second drain electrode 175b are partially surrounded, respectively, by the first source electrode 173a and the second source electrode 173b. The wide end portion of the second drain electrode 175b is extended lengthwise to form the third source electrode 173c, which is formed in a 'U' shape. The wide end portion 177c of the third drain electrode 175c overlaps the storage extension portion 126 to form a down capacitor Cstd. The bar type end portion of the third drain electrode 175c is partially surrounded by the third source electrode 173c.

The first, second, and third gate electrodes 124a, 124b, and 124c, the first, second, and third source electrodes 173a, 173b, and 173c, and the first, second, and third drain electrodes 175a, 175b, and 175c form first, second, and third thin film transistors (TFTs) Qa, Qb, and Qc together with first, second, and third island semiconductors 154a, 154b, and 154c, and a channel of each thin film transistor is formed in each of the semiconductors 154a, 154b, and 154c between each of the source electrodes 173a, 173b, and 173c and each of the drain electrodes 175a, 175b, and 175c.

The linear semiconductor 151, including the semiconductors 154a, 154b, and 154c, has a side wall having the same planar shape as the side walls of the data conductors 171, 175a, 175b, and 175c and the ohmic contacts 161 and 165a, except for channel regions between the source electrodes 173a, 173b, and 173c and the drain electrodes 175a, 175b, and 175c. That is, the linear semiconductor 151, including the semiconductors 154a, 154b, and 154c, has an exposed portion which is not covered by the data conductors 171, 175a, 175b, and 175c and is between the source electrodes 173a, 173b, and 173c and the drain electrodes 175a, 175b, and 175c.

A lower passivation layer 180p made of, for example, an inorganic insulator such as silicon nitride or silicon oxide is formed on the data conductors 171, 175a, 175b, and 175c and the exposed portions of the semiconductors 154a, 154b, and 154c.

Color filters 230 and a light blocking member 220 are disposed on the lower passivation layer 180p.

The color filters 230 are disposed to cover the region between the adjacent data lines excluding regions where the first thin film transistor Qa, the second thin film transistor Qb, and the third thin film transistor Qc are positioned. Each color filter 230 may display one of three primary colors such as, for example, red, green, and blue.

The light blocking member 220, referred to as a black matrix, prevents light leakage through the display panels. The light blocking member 220 includes an opening 225, a portion covering the regions at which the first thin film transistor Qa, the second thin film transistor Qb, and the third thin film transistor Qc are positioned, and a portion extending along the data lines 171 and covering the data lines 171.

An upper passivation layer 180q is formed on the color filter 230 and the light blocking member 220. The upper passivation layer 180q may be made of, for example, an (organic) insulator and provides a flat surface.

A plurality of contact holes 185a and 185b exposing each of the wide end portion of the first drain electrode 175a and the wide end portion of the second drain electrode 175b, respectively, are formed through the lower passivation layer 180p and the upper passivation layer 180q. The light blocking member 220 around the contact holes 185a and 185b may be removed.

A pixel electrode 191, including a first subpixel electrode 191a and a second subpixel electrode 191b, is formed on the upper passivation layer 180q.

The first and second subpixel electrodes 191a and 191b are adjacent to each other in a column direction. A height of the second subpixel electrode 191b is larger than that of the first subpixel electrode 191a, and the height of the second subpixel electrode 191b may be about once to three times larger than the first subpixel electrode 191a.

The entire, overall shapes of the first subpixel electrode 191a and the second subpixel electrode 191b are quadrangles, and each subpixel electrode includes cross stems 195a and 195b including a horizontal stem and a vertical stem, protrusion portions 192a and 192b protruding, respectively, downwards and upwardsfrom the vertical stem of the cross stems 195a and 195b, and a plurality of minute branches 199a and 199b obliquely extending outward from the cross stems 195a and 195b. Minute slits 91a and 91b are disposed between adjacent minute branches 199a and 199b in each of the first subpixel electrode 191a and the second subpixel electrode 191b. The minute branches 199a and 199b or the minute slits 91a and 91b may form an angle of approximately 45 degrees or 135 degrees with the gate line 121.

The protrusion portion 192a of the first subpixel electrode 191a receives a data voltage from the first drain electrode 175a through the contact hole 185a, and the protrusion portion 192b of the second subpixel electrode 191b receives a data voltage from the second drain electrode 175b through the contact hole 185b. The data voltage applied to the second subpixel electrode 191b may be smaller than the data voltage applied to the first subpixel electrode 191a.

A vertical alignment layer 11 may be formed on the first and second subpixel electrodes 191a and 191b and the upper passivation layer 180q.

The liquid crystal layer 3 interposed between the lower panel 100 and the upper panel 200 may include liquid crystal molecules 31 having a negative dielectric anisotropy.

Referring to FIG. 1 and FIG. 3, the liquid crystal molecules 31 are initially aligned with a pretilt, i.e. they are rotated towards the substrate, and are not vertical, when no electric field is applied to the liquid crystal layer 3. The liquid crystal molecules 31 have a pretilt oriented in a direction parallel to the extension direction of the minute branches 199a and 199b. In particular, in an area which is formed along the signal line and disposed above the signal line, such as the data line 171, (area Aup in FIG. 3) the liquid crystal molecules 3 are aligned with a pretilt having a degree of rotation that is substantially larger than that of liquid crystal molecules outside of this area. Thus, the area Aup is an "over-pretilt" area, as compared to the remaining area of the substrates, which are referred to herein as 'a general pretilt area'. In detail, a long axis of the liquid crystal molecules 31 of the over-pretilt area Aup may form an inclination angle B (referred to as a pretilt angle) of about 10 degrees to about 89.5 degrees with respect to a normal line to the surfaces of the two panels 100 and 200. In the general pretilt area, the long axis of the liquid crystal molecule 31 may form a pretilt angle over about 0 and under about 60 degrees with respect to a normal line to the surfaces of the two panels 100 and 200.

The first and second subpixel electrodes 191a and 191b supplied with data voltages, together with the opposing electrode 270 of the upper panel 200, generate an electric field in the liquid crystal layer 3, and the liquid crystal molecules 31 are inclined in response to the generated electric field. In this case, because the liquid crystal molecules 31 are pretilted, the inclination directions by the pretilted direction, and rotated directly along the direction that the liquid crystal molecules are inclined via the pretilt. As a result, the response speed of the liquid crystal molecules 31 may be increased. In particular, in an exemplary embodiment, because the liquid crystal molecules 31 positioned in the over-pretilt area Aup of the liquid crystal layer 3, which is formed along the signal line and disposed above the signal line, such as the data line 171, are excessively pretilted as compared with that of the other areas, for example, the general pretilt area, when an electric field is generated in the liquid crystal layer 3, the inclination directions of the liquid crystal molecules 31 can be more easily and promptly determined. Therefore, the liquid crystal molecules 31 can be more rapidly inclined. As a result, like a domino, even the liquid crystal molecules 31 disposed in the general pretilt area may be more rapidly rotated in the pretilted direction. Accordingly, the response speed of the liquid crystal display may be significantly improved.

Although the liquid crystal molecules 31 in the over-pretilt area Aup are excessively pretilted, because the light blocking member 220 is formed at a portion overlapping the over-pretilt area Aup to prevent the light leakage in the over-pretilt area Aup, the contrast ratio of the liquid crystal display is not deteriorated.

In an exemplary embodiment, because the first and second subpixel electrodes 191a and 191b include four subregions having different extension directions of the minute branches 199a and 199b and the minute slits 91a and 91b, there are also four different pretilted directions of the liquid crystal molecules 31 of the liquid crystal layer 3. As such, because the inclination directions of the liquid crystal molecule 31 are varied, the reference viewing angle of the liquid crystal display may be increased. A member of the liquid crystal display device of the present exemplary embodiment such as the minute branches 199a and 199b and/or the minute slits 91a and 91b, which determine the tilt direction, i.e., the inclination direction in which the liquid crystal molecule 31 are aligned, are referred to herein as a "tilt direction determining member."

In another aspect of an exemplary embodiment, when a prepolymer which is polymerized by light or by heat is included in the alignment layers 11 and 21, and the alignment layers 11 and 21 are irradiated with light or heated to form a polymer controlling the tilt direction of the liquid crystal molecules 31, the polymer formed in the alignment layers 11 and 21 may act as the tilt direction determining member. In this case, the liquid crystal molecules 31 may be bonded with the polymer formed in the alignment layers 11 and 21, such that the tilt direction of the liquid crystal molecules 31 may be determined.

According to the inclination degree of the liquid crystal molecules 31 upon application of an electric field, variation in polarization of light that is input into and through the liquid crystal layer 3 is determined, and the variation of polarization determines variation in transmittance by a polarizer, such that the liquid crystal display displays an image.

The first subpixel electrode 191a and the opposing electrode 270 form a first liquid crystal capacitor Clca together with the liquid crystal layer 3 interposed therebetween, and the second subpixel electrode 191b and the opposing electrode 270 form a second liquid crystal capacitor Clcb together with the liquid crystal layer 3 interposed therebetween, such that the applied voltages are maintained even after the first and second thin film transistors Qa and Qb are turned off.

Hereinafter, an operation of the liquid crystal display according to an exemplary embodiment will be described.

First, when the gate-on voltage Von is applied to the gate line 121, the first and second thin film transistors Qa and Qb connected thereto are turned on, and a data voltage of the data line 171 is equally applied to the first and second subpixel electrodes 191a and 191b through the turned-on first and second thin film transistors Qa and Qb. Because the first and second liquid crystal capacitors Clca and Clcb are charged by as much as a difference between the common voltage Vcom applied to the opposing electrode 270 and the voltage of the first and second subpixel electrodes 191a and 191b, the charged voltage of the first liquid crystal capacitor Clca is also the same as the charged voltage of the second liquid crystal capacitor Clcb. When the gate-on voltage Von is applied to the gate line 121, the gate-off voltage Voff is applied to the down gate line 123 at the same time.

Next, when the gate-off voltage Voff is applied to the gate line 121 and the gate-on voltage Von is applied to the down gate line 123 at the same time, the first and second thin film transistors Qa and Qb connected to the gate line 121 are turned off and the third thin film transistor Qc is turned on. Accordingly, an electric charge charged in the second subpixel electrode 191b which is connected to an output terminal of the second thin film transistor Qb flows into the down capacitor Cstd, such that the voltage of the second liquid crystal capacitor Clcb is decreased and the voltage of the second liquid crystal capacitor Clcb is also decreased.

Therefore, the charged voltage of the second liquid crystal capacitor Clcb can always be smaller than that of the first liquid crystal capacitor Clca, and accordingly, the charged voltages of the first and second liquid crystal capacitors Clca and Clcb can be different from each other, such that the side visibility of the liquid crystal display can be improved. In another aspect of the present embodiment, the first and second thin film transistors Qa and Qb of the first and second subpixel electrodes 191a and 191b may receive different data voltages which are acquired from a single piece of image information through different data lines or at different times.

Hereinafter, a method of manufacturing the liquid crystal display will be described with reference to FIGS. 4 to 12 together with FIGS. 1 to 3 described above.

Figure 4:
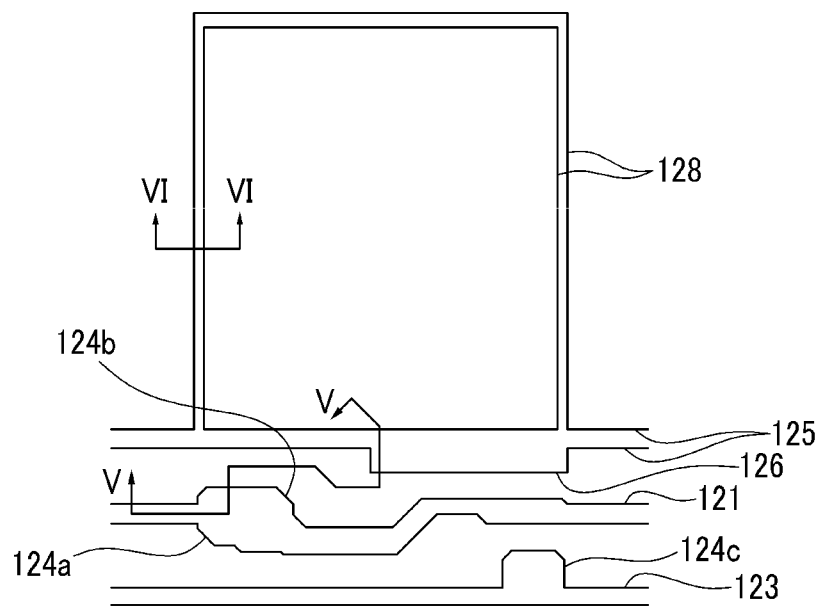
FIG. 4 is a layout views in a middle step of a method for manufacturing the liquid crystal display shown in FIG. 1 according to an exemplary embodiment.
Figure 5:
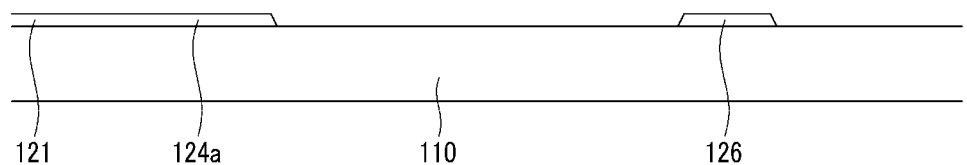
FIGS. 5 and 6 are cross-sectional views of the liquid crystal display taken along lines V-V and VI-VI of FIG. 4, respectively.
Figure 6:
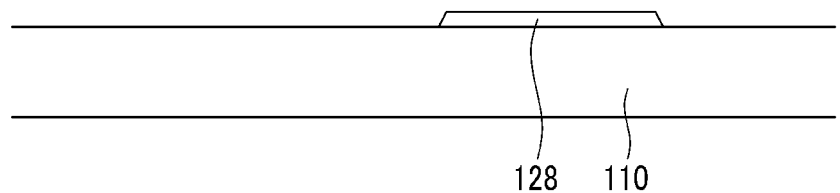
Figure 7:
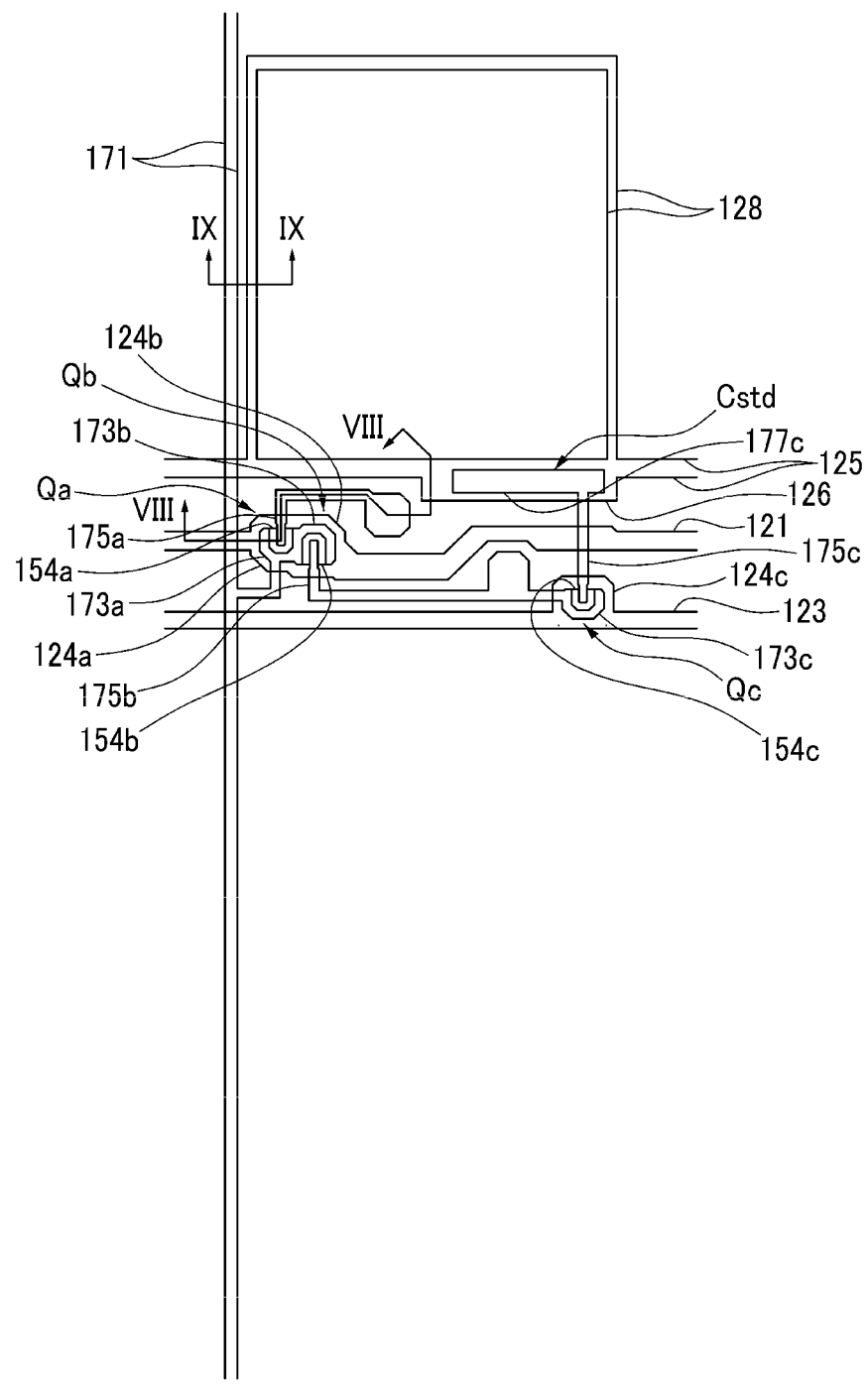
FIG. 7 is a layout views in a middle step of a method for manufacturing the liquid crystal display shown in FIG. 1 according to an exemplary embodiment.
Figure 8:
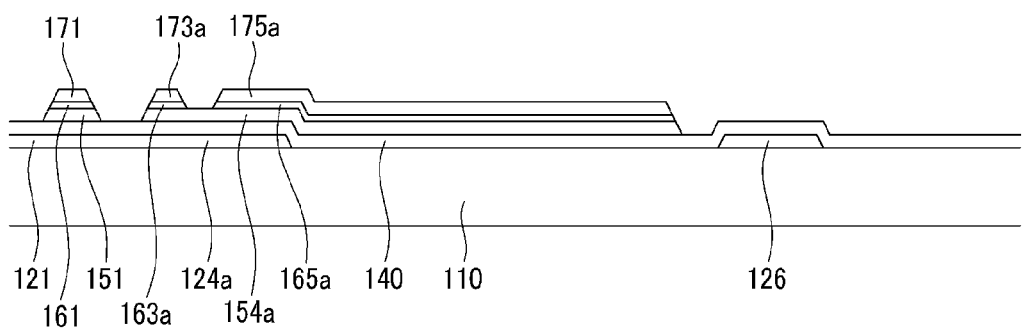
FIGS. 8 and 9 are cross-sectional views of the liquid crystal display taken along lines VIII-VIII and IX-IX of FIG. 7, respectively.
Figure 9:
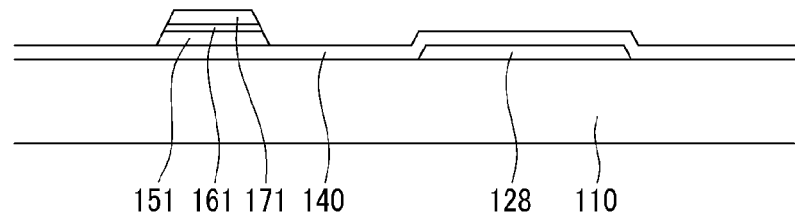
Figure 10:
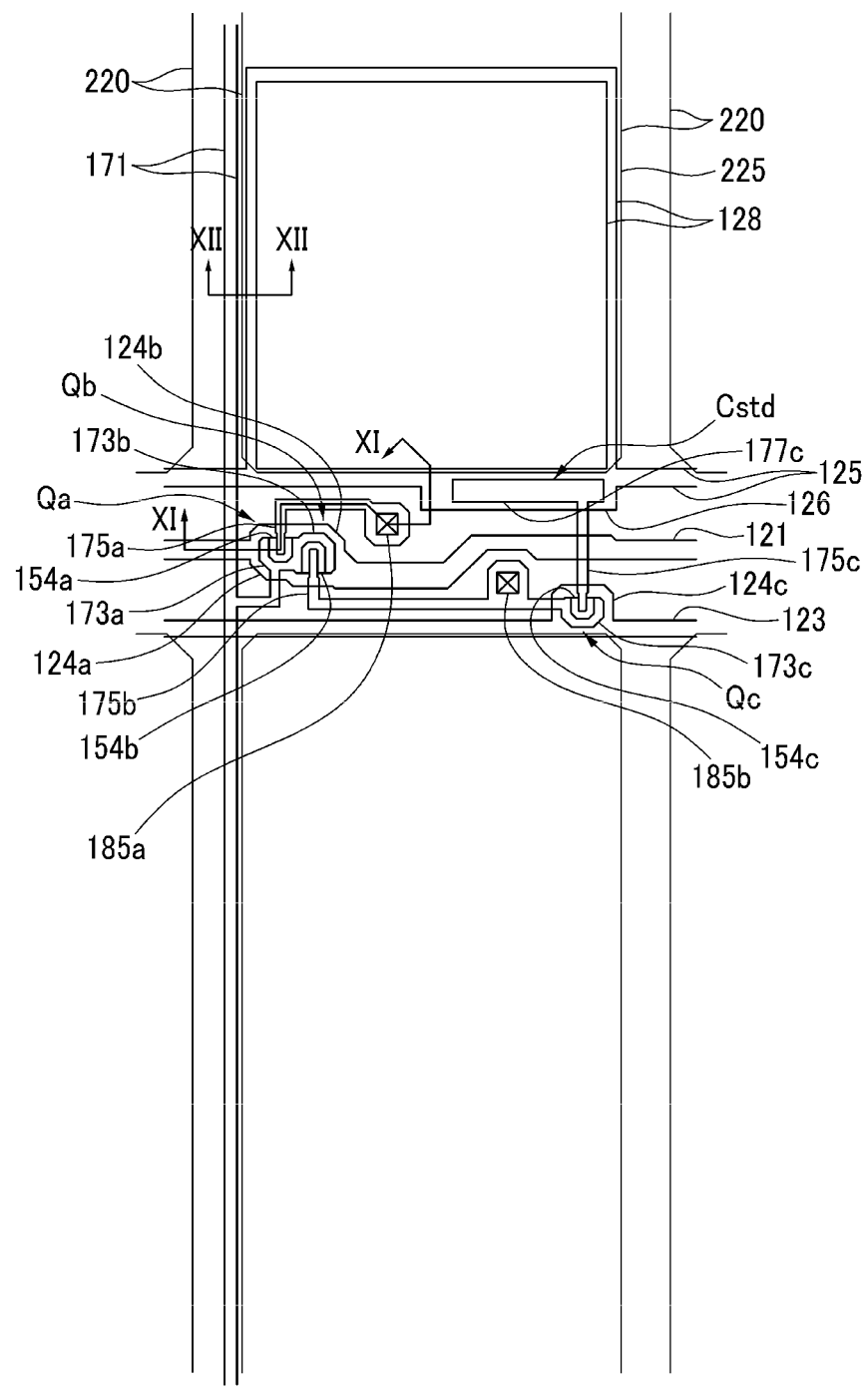
FIG. 10 is a layout views in a middle step of a method for manufacturing the liquid crystal display shown in FIG. 1 according to an exemplary embodiment.
Figure 11:
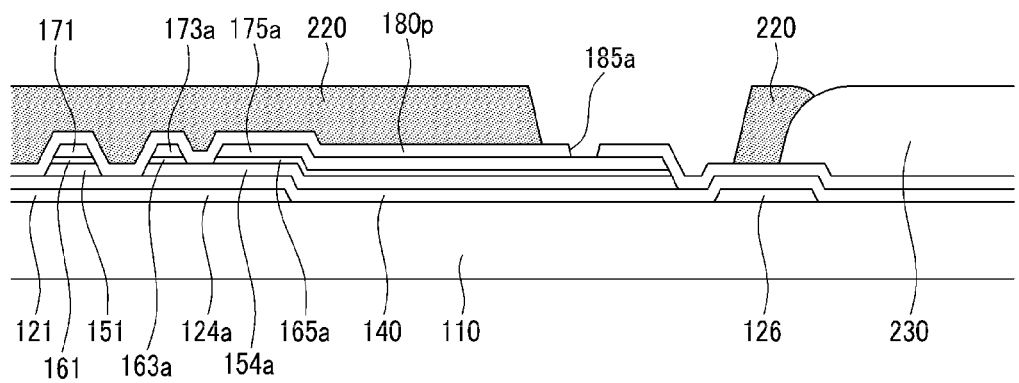
FIGS. 11 and 12 are cross-sectional views of the liquid crystal display taken along lines XI-XI and XII-XII of FIG. 10, respectively.
Figure 12:
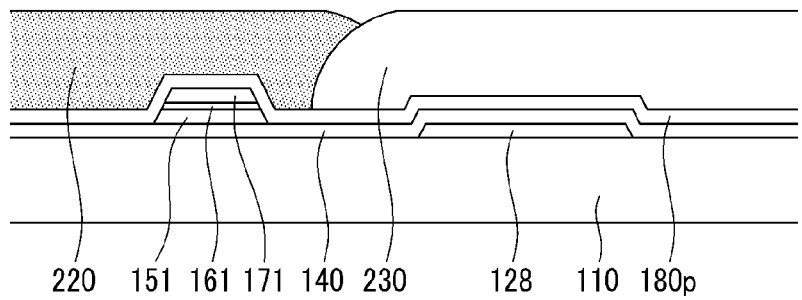

FIGS. 4, 7, and 10 are layout views in a middle step of a method for manufacturing the liquid crystal display shown in FIG. 1 according to an exemplary embodiment, FIGS. 5 and 6 are cross-sectional views of the liquid crystal display taken along lines V-V and VI-VI of FIG. 4, respectively, FIGS. 8 and 9 are cross-sectional views of the liquid crystal display taken along lines VIII-VIII and IX-IX of FIG. 7, respectively, and FIGS. 11 and 12 are cross-sectional views of the liquid crystal display taken along lines XI-XI and XII-XII of FIG. 10, respectively.

First, referring to FIGS. 4 to 6, a gate conductive layer (not shown) is deposited on an insulation substrate 110, and a plurality of gate conductors including a plurality of gate lines 121, a plurality of down gate lines 123, and a plurality of storage electrode lines 125 are formed by photolithography.

Next, referring to FIGS. 7 to 9, a gate insulating layer 140 is formed by depositing, for example, an inorganic insulator and the like on the gate conductor.

Subsequently, a semiconductor layer (not shown) and a semiconductor layer doped with impurities (not shown) are sequentially deposited, and a data conductive layer (not shown) is deposited thereon through a sputtering method and the like. Then, a plurality of linear semiconductors 151 including the first, second, and third semiconductors 154a, 154b, and 154c, a plurality of ohmic contacts 161, 163a and 165a, data conductors including a plurality of data lines 171, a plurality of first drain electrodes 175a, a plurality of second drain electrodes 175b, and a plurality of third drain electrodes 175c are formed by photolithography.

Next, referring to FIGS. 10 to 12, an inorganic insulator such, for example, as silicon nitride or silicon oxide is deposited on the data conductors 171, 175a, and 175b, and 175c and on the exposed portions of the semiconductors 154a, 154b, and 154c by using a chemical vapor deposition (CVD) method and the like to form a lower passivation layer 180p.

Subsequently, color filters 230 and light blocking members 220 having an opening 225 are sequentially formed on the lower passivation layer 180p. A portion of the light blocking member 220 corresponding to the first and second drain electrode 175a and 175b may be removed.

Next, as shown in FIGS. 1 to 3, silicon nitride or silicon oxide, for example, is deposited on the color filters 230 and the light blocking members 220 to form an upper passivation layer 180q. Subsequently, a plurality of contact holes 185a and 185b are formed by etching the lower passivation layer 180p and the upper passivation layer 180q.

Thereafter, the pixel electrode 191, including the first subpixel electrode 191a and the second subpixel electrode 191b, is formed by depositing, for example, IZO or ITO on the upper passivation layer 180q with the sputtering method, and then etching the deposited IZO or ITO. An alignment layer 11 is formed on the pixel electrode 191 to complete the lower panel 100.

Next, an opposing electrode 270 is formed by depositing, for example, IZO or ITO on another insulation substrate 210, and an alignment layer 21 is formed thereon to complete the upper panel 200.

Next, the lower panel 100 and the upper panel 200 are aligned and attached to each other. If necessary, a cutting process of the two substrates 110 and 210 may be added.

Next, the liquid crystal layer 3 including liquid crystal molecules is formed between the two panels 100 and 200 by injecting a liquid crystal material, as are known in the art, between the first and second substrate 100 and 200. As will be described in more detail with reference to FIG. 13 together with FIG. 3, an electric field is then generated in the liquid crystal layer 3, so that the liquid crystal molecules 31 are initially aligned so as to have a pretilt. This will be described in detail with reference to FIG. 13 together with FIG. 3 described above.

Figure 13:
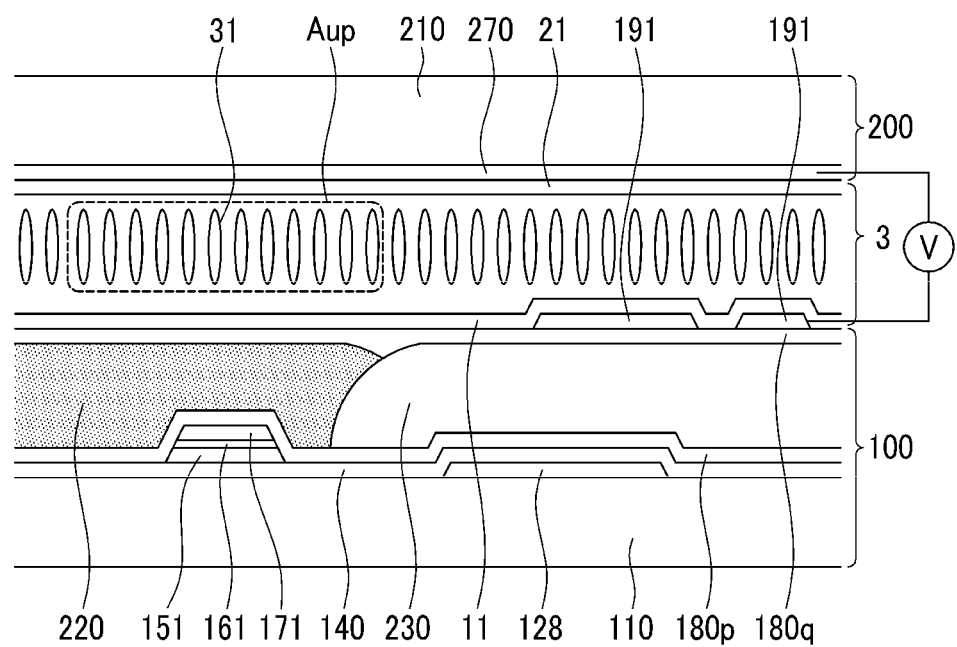
FIGS. 13 and 14 are cross-sectional views in a middle step of a method for manufacturing the liquid crystal display shown in FIG. 1 according to an exemplary embodiment, respectively, in which the liquid crystal layer is exposed in an electric field.

FIG. 13 is a cross-sectional view in a process in a method for manufacturing the liquid crystal display shown in FIG. 1 according to an exemplary embodiment.

First, a prepolymer, such as a monomer, that can be cured by polymerization by light, such as ultraviolet light, or by heat is injected between the lower panel 100 and the upper panel 200. Alternatively, when the alignment layers 11 and 21 are formed as above, a prepolymer may be included in the alignment material. The prepolymer may be, for example, a reactive mesogen that can be polymerized by light such as ultraviolet light.

Next, as shown in FIG. 13, an electric field is generated in the liquid crystal layer 3 between the two panels 100 and 200 by applying voltages to the pixel electrode 191 of the lower panel 100, which includes the first and second subpixel electrodes 191a and 191b, and the opposing electrode 270 of the upper panel 200. Voltages may be applied to both the pixel electrode 191 and the opposing electrode 270 by applying the gate-on voltage Von to the gate line 121 of the lower panel 100, or a constant voltage may be applied only to the opposing electrode 270 of the upper panel 200 while no voltage is applied to the pixel electrode 191 by applying the gate-off voltage Voff to the gate line 121.

The liquid crystal molecules 31 of the liquid crystal layer 3 are then rotated in response to the electric field, and initially, the liquid crystal molecules 31 tend to incline so as to align in a direction perpendicular to the sides of the minute branches 199a and 199b or the minute slits 91a and 91b. However, because the horizontal components of the electric fields generated by the sides of the adjacent minute branches 199a and 199b or the adjacent minute slits 91a and 91b have opposite directions, and the widths of the minute branches 199a and 199b or the minute slits 91a and 91b are small, the liquid crystal molecules that incline so as to align in opposite directions are eventually aligned in a direction parallel to the extension direction of the minute branches 199a and 199b or the minute slits 91a and 91b.

Next, while the electric field is maintained in the liquid crystal layer 3, the prepolymer included in the liquid crystal layer 3 or in the alignment layers 11 and 21 is polymerized to form a polymer. For example, the prepolymer may be irradiated with light, such as ultraviolet light, while the electric field is maintained in the liquid crystal layer 3. In the exemplary embodiment where the prepolymer is included in the alignment layers 11 and 21, a polymer such as a side chain polymer which controls the pretilt of the liquid crystal molecules may be formed in the alignment layers 11 and 21 by polymerization of the polymer, for example by irradiation with the light. As a result of this process, when the electric field is removed from the liquid crystal layer 3, the polymer controls the liquid crystal molecules 31 so that they are aligned with a pretilt in the extension direction of the minute branches 199a and 199b. This process is called as an electric field exposure process or a primary pretilt process.

Next, a potential difference between the pixel electrode 191 of the lower panel 100 and the opposing electrode 270 of the upper panel 200 is set to 0V while a voltage is applied to the data line 171 of the lower panel 100. For example, by applying the gate-off voltage Voff to the gate line 121, no voltage is applied to the pixel electrode 191, and at the same time, no voltage is applied to the opposing electrode 270 of the upper panel 200. Alternatively, 0V or the same voltages may be applied to the pixel electrode 191 and the opposing electrode 270 to make the potential difference between the pixel electrode 191 and the opposing electrode 0V. For the data line 171 which does have a voltage applied, the potential difference between the data line 171 and the opposing electrode 270 may be in the range from about 7V to about 30V.

As a result, there is no electric field generated in most of the liquid crystal layer 3 between the pixel electrode 191 and the opposing electrode 270, with the exception that there is an electric field generated in the portion of the liquid crystal layer 3 in the over-pretilt area Aup where the data line 171 is disposed due to the potential difference between the data line 171 and the opposing electrode 270. In order to form an excessive pretilt of the liquid crystal molecules 31 in the over-pretilt area Aup, the potential difference between the data line 171 and the opposing electrode 270 may be larger than the potential difference between the pixel electrode 191 and the opposing electrode 270 in the primary pretilt process. As such, when the electric filed is generated only in the vicinity of the over-pretilt area Aup, the remaining prepolymer that was not polymerized in the primary pretilt process can be polymerized to form the polymer, for example by irradiated the liquid crystal layer 3 with light, such as ultraviolet light. The polymer may maintain the excessive pretilt of the liquid crystal molecules 31 in the over-pretilt area Aup. This process is called a non-electric field exposure process or a secondary pretilt process.

In the present exemplary embodiment, the secondary pretilt process is performed by providing a potential difference between the data line 171 and the opposing electrode 270, but the secondary pretilt process may be performed by providing a potential difference between another signal line, such as the gate line 121, and the opposing electrode 270. In this case, the portion of the liquid crystal layer 3 having the excessive pretilt as a result of the secondary pretilt process, that is, the over-pretilt area Aup, may be covered by the light blocking member 220.

An initial alignment method according to another exemplary embodiment to provide the liquid crystal molecules 31 with a pretilt will be described with reference to FIG. 14. The same descriptions as the exemplary embodiment described above are omitted, but differences will be described.

Figure 14:
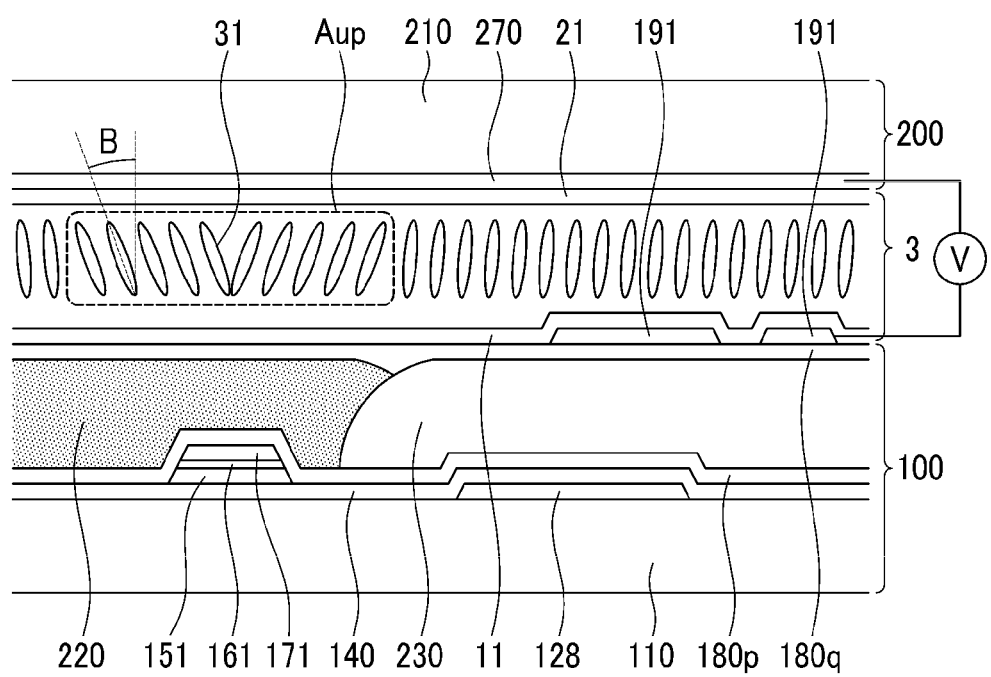

FIG. 14 is a cross-sectional view of a process in a method for manufacturing the liquid crystal display shown in FIG. 1 according to an exemplary embodiment.

First, like the exemplary embodiment described above, the prepolymer is injected between the lower panel 100 and the upper panel 200 together with the liquid crystal material, or included in the alignment material when forming the alignment layers 11 and 21. Then, as shown in FIG. 14, an electric field is generated in the liquid crystal layer 3 between the two panels 100 and 200 by applying a predetermined potential difference between the pixel electrode 191 of the lower panel 100 and the opposing electrode 270 of the upper panel 200. Simultaneously, a voltage is applied to the data line 171. The potential difference between the data line 171 and the opposing electrode 270 is larger than the potential difference between the pixel electrode 191 and the opposing electrode 270. For example, the potential difference of the opposing electrode 270 with respect to the pixel electrode 191 may be in the range from about 7V to about 15V, and the potential difference of the data line 171 with respect to the opposing electrode 270 may be in the range from about −45V to about −17V. Alternatively, the voltage having the potential difference of 7V to 15V with respect to the voltage of the pixel electrode 191 may be applied to the opposing electrode 270, and the voltage having the potential difference of −30V to −10V with respect to the voltage of the pixel electrode 191 may be applied to the data line 171.

In this case, the gate-off voltage Voff is applied to the gate line 121 of the lower panel 100, such that the voltage of the data line 171 is not transmitted to the pixel electrode 191, which includes the first and second subpixel electrodes 191*a* and 191*b*.

As described above, while an electric field is generated in the liquid crystal layer 3, the prepolymer is polymerized, for example by irradiating the liquid crystal layer 3 with light, and the liquid crystal molecules 31 of the liquid crystal layer 3 then have the pretilt controlled by the polymer. In particular, because a stronger electric field is generated in the over-pretilt area Aup of the liquid crystal layer 3 disposed above the data line 171 as compared with the remaining area, that is, the general pretilt area, the liquid crystal molecules 31 of the over-pretilt area Aup are more inclined than the general pretilt area, i.e. the liquid crystal molecules 31 in the over-pretilt area are aligned with an inclination angle that is greater than the inclination angle at which the liquid crystal molecules 31 in the general pretilt area are aligned. Accordingly, the liquid crystal molecules 31 in the over-pretilt area Aup can have an excessive pretilt compared to the general pretilt area. A long axis of the liquid crystal molecules 31 in the over-pretilt area Aup may form an angle of about 10 degrees to about 89.5 degrees with respect to a normal line to the surfaces of the two panels 100 and 200, while liquid crystal molecules 31 in the general pretilt area may form an angle substantially less than the pretilt angle of the liquid crystal molecules in the over-pretilt area, for example, the angle of the liquid crystal molecules 31 in the general pretilt area may be in a range over about 10 and under about 60 degrees.

As described above, according to the exemplary embodiment, the pretilt angle of the liquid crystal molecules 31 in the general pretilt area of the liquid crystal layer 3 and the excessive pretilt angle of the liquid crystal molecules 31 in the over-pretilt area Aup, which corresponds to an area in which the data line 171 covered by the light blocking member 220 is formed, may be simultaneously formed through one exposure process.

In the present exemplary embodiment, the excessive pretilt angle is formed in the over-pretilt area Aup with the potential difference between the data line 171 and the opposing electrode 270 compared to other portions, but the excessive pretilt angle of the liquid crystal molecules 31 in the over-pretilt area Aup may be formed with the excessive potential difference between a different signal line, such as the gate line and the opposing electrode 270. In this case, the over-pretilt area Aup may be covered by the light blocking member 220.

In addition, the exemplary embodiment may be also applied to various vertical alignment mode liquid crystal displays in which the liquid crystal molecules have a pretilt. Particularly, in an exemplary embodiment of the present invention, one pixel electrode 191 includes two subpixel electrodes 191*a* and 191*b*, but one pixel electrode 191 may be formed with one electrode. In addition, in an exemplary embodiment, the minute branches 199*a* and 199*b* or the minute slits 91*a* and 91*b* formed in the pixel electrode 191 are examples of the tilt direction determining member, which determines the tilt direction of the liquid crystal molecules 31, but the tilt direction determining member is not limited thereto, and may include, for example, various cutouts, protrusions, and the like in a field generating electrode of the liquid crystal display device.

Further, according to another exemplary embodiment, the light blocking member 220 or the color filter 230 of the liquid crystal display of the exemplary embodiment described above may be positioned at the upper panel 200. This will be described with reference to FIGS. 15 to 18 together with FIG. 1 described above. The same constituent elements as the above-described exemplary embodiment have the same reference numerals, and duplicative descriptions are omitted.

Figure 15:
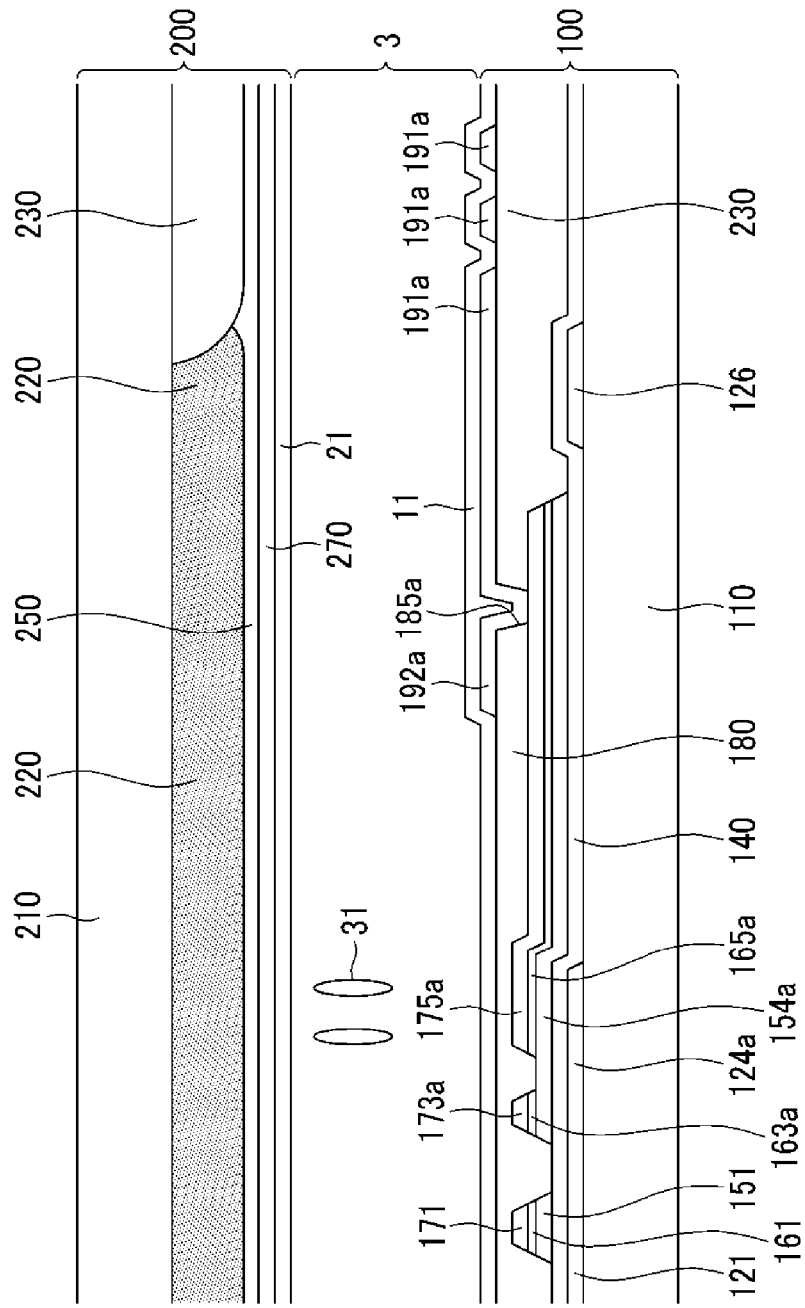
FIGS. 15 and 16 are another example of cross-sectional views of the liquid crystal display taken along lines II-II and III-III of FIG. 1, respectively.
Figure 16:
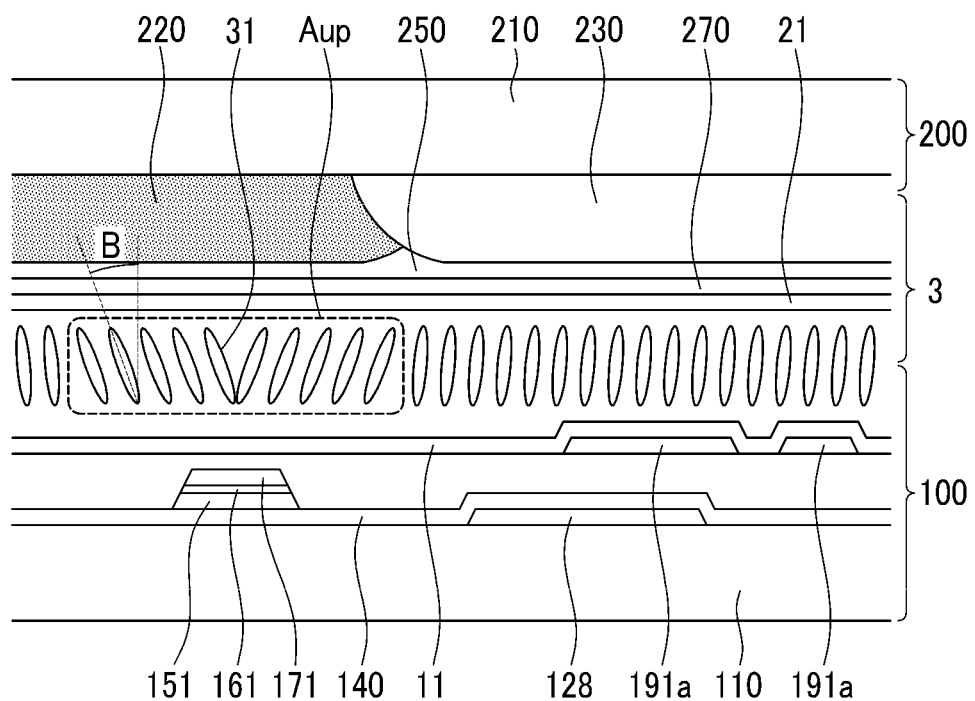
Figure 17:
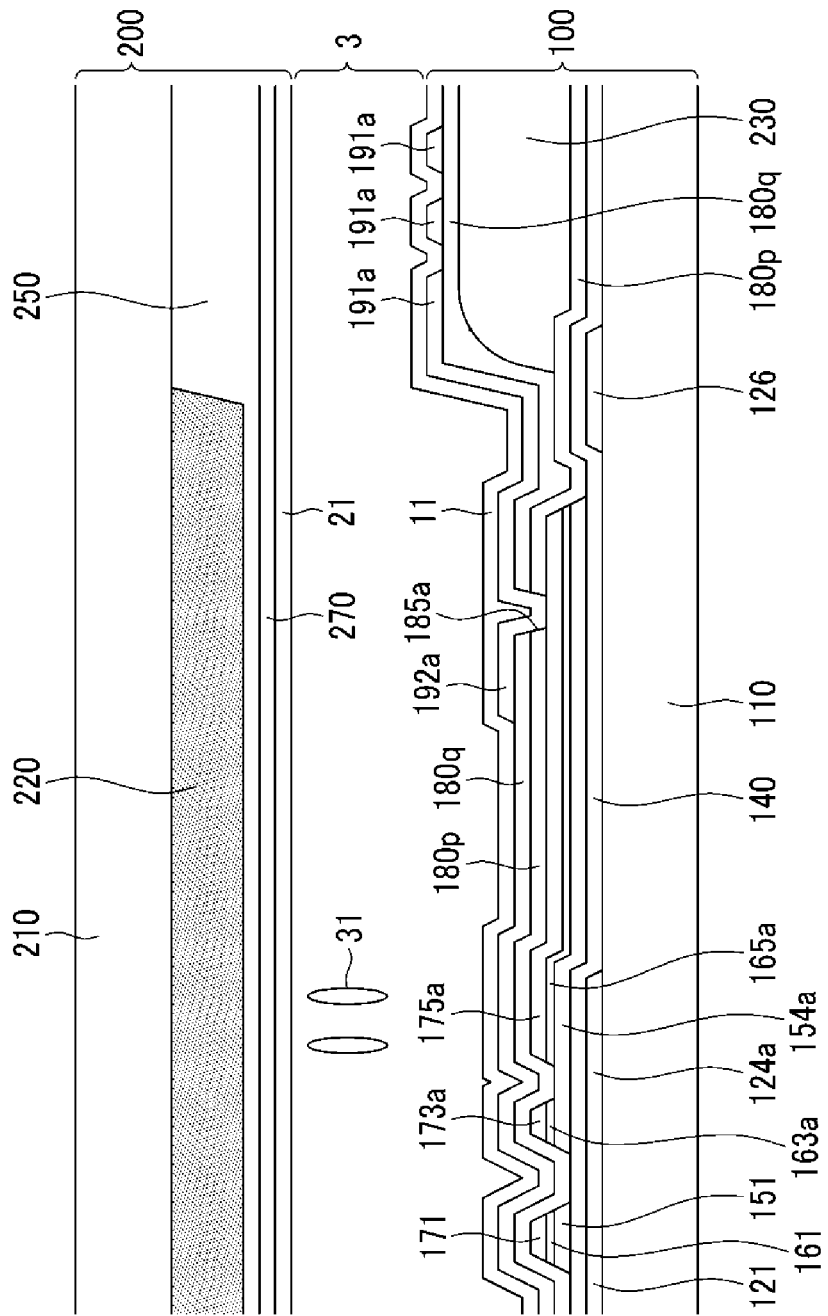
FIGS. 17 and 18 are yet another example of cross-sectional views of the liquid crystal display taken along lines II-II and III-III of FIG. 1, respectively.
Figure 18:
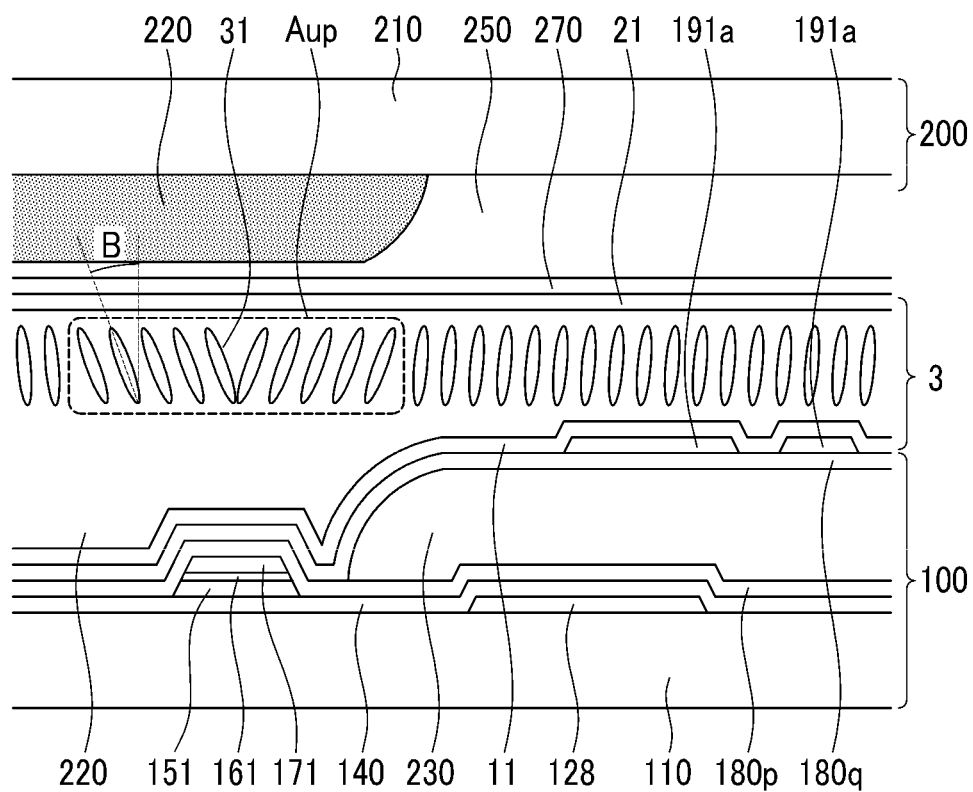

FIGS. 15 and 16 are another example of cross-sectional views of the liquid crystal display taken along lines II-II and III-III of FIG. 1, respectively and FIGS. 17 and 18 are yet another example of cross-sectional views of the liquid crystal display taken along lines II-II and III-III of FIG. 1, respectively.

First, referring to FIGS. 1, 15, and 16, the liquid crystal display according to an exemplary embodiment is mostly the same as the liquid crystal display shown in FIGS. 1 to 3 described above, but positions of the light blocking member 220 and the color filter 230 may be different.

More particularly, a passivation layer 180 made of an inorganic insulator or an organic insulator is formed on the data conductors 171, 175*a*, 175*b*, and 175*c* and the exposed portions of the semiconductor 154*a*, 154*b*, and 154*c* of the lower panel 100. The passivation layer 180 includes a plurality of contact holes 185a and 185b and may have a flat surface. A pixel electrode 191, which includes a first subpixel electrode 191a and a second subpixel electrode 191b, and an alignment layer 11 are formed on the passivation layer 180.

Light blocking members 220 and color filters 230 are formed on the insulation substrate 210 of the upper panel 200. The order that the light blocking member 220 and the color filter 230 are deposited may be changed. An overcoat 250 is formed on the light blocking member 220 and the color filter 230. The overcoat 250 may be made, for example, of an (organic) insulator, and may prevent the color filter 230 from being exposed and provide a flat surface. An opposing electrode 270 and the alignment layer 21 are formed on the overcoat 250.

Another exemplary embodiment shown in FIGS. 1, 17, and 18 is mostly the same as the liquid crystal display shown in FIGS. 1 to 3 described above, but the position of the light blocking member 220 is different.

More particularly, the color filter 230 is formed on the lower passivation layer 180p of the lower panel 100 and the upper passivation layer 180q is formed thereon. The upper passivation layer 180q may be made of, for example, an (organic) insulator and may have a flat surface.

The light blocking member 220 is formed on the insulation substrate 210 of the upper panel 200, and the overcoat 250 is formed thereon. The overcoat 250 may be made of, for example, an (organic) insulator and may have a flat surface. The opposing electrode 270 and the alignment layer 21 are formed on the overcoat 250.

Alternatively, the color filter 230 may be positioned on the upper panel 200, and the light blocking member 220 may be positioned on the lower panel 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure including the appended claims.

<Description of symbols>

| | |
|---|---|
| 3: Liquid crystal layer | 31: Liquid crystal molecule |
| 100: Lower panel | 110, 210: Insulation substrate |
| 121: Gate line | 123: Down gate line |
| 124a, 124b, 124c: Gate electrode | 125: Storage electrode line |
| 140: Gate insulating layer | 151, 154a, 154b, 154c: Semiconductor |
| 161, 163a, 165a: Ohmic contact | |
| 171: Data line | 173a, 173b, 173c: Source electrode |
| 175a, 175b, 175c: Drain electrode | 180p, 180q: Passivation layer |
| 185a, 185b: Contact hole | 191: Pixel electrode |
| 191a, 191b: Subpixel electrode | 200: Upper panel |
| 220: Light blocking member | 230: Color filter |
| 270: Opposing electrode | |

What is claimed is:

1. A liquid crystal display, comprising:
a first substrate and a second substrate facing each other;
a pixel electrode disposed on the first substrate;
an opposing electrode disposed on the second substrate;
a liquid crystal layer in a vertical alignment mode interposed between the first substrate and the second substrate, the liquid crystal layer including a plurality of liquid crystal molecules; and
a tilt direction determining member configured to determine tilt directions of the liquid crystal molecules when an electric field is generated in the liquid crystal layer,
wherein the liquid crystal layer includes a first area and a second area, in each of the first area and the second area, the liquid crystal molecules being aligned to have a pretilt without the electric field generated in the liquid crystal layer, and
a pretilt angle of the liquid crystal molecules in the first area is larger than a pretilt angle of the liquid crystal molecules in the second area.

2. The liquid crystal display of claim 1, further comprising:
a light blocking member disposed on the first substrate or the second substrate,
wherein the first area overlaps the light blocking member.

3. The liquid crystal display of claim 2, further comprising:
a signal line disposed on the first substrate,
wherein the first area is formed along the signal line.

4. The liquid crystal display of claim 3, wherein:
the signal line comprises a data line transmitting a data voltage.

5. The liquid crystal display of claim 4, wherein:
a long axis of the liquid crystal molecules in the first area forms an angle of about 10 degrees to about 89.5 degrees with respect to a normal line of surfaces of the first substrate and the second substrate.

6. The liquid crystal display of claim 5, wherein:
the tilt direction determining member comprises a plurality of minute slits formed in the pixel electrode, and
the liquid crystal molecules are pretilted substantially in an extension direction of the minute slit.

7. The liquid crystal display of claim 5, further comprising:
an alignment layer disposed on at least one of the pixel electrode and the opposing electrode,
wherein the tilt direction determining member comprises a polymer formed in the alignment layer.

8. The liquid crystal display of claim 1, further comprising:
a signal line disposed on the first substrate,
wherein the first area is formed along the signal line.

9. The liquid crystal display of claim 8, wherein:
the signal line further comprises a data line transmitting a data voltage.

10. The liquid crystal display of claim 1, wherein:
a long axis of the liquid crystal molecules in the first area forms an angle of about 10 degrees to about 89.5 degrees with respect to a normal line to surfaces of the first substrate and the second substrate.

11. The liquid crystal display of claim 1, wherein:
the tilt direction determining member comprises a plurality of minute slits formed in the pixel electrode, and
the liquid crystal molecules are pretilted in an extension direction of the minute slit.

12. The liquid crystal display of claim 1, further comprising:
an alignment layer disposed on at least one of the pixel electrode and the opposing electrode,
wherein the tilt direction determining member comprises a polymer formed in the alignment layer.

13. The liquid crystal display of claim 1, wherein:
the liquid crystal layer further comprises a polymer for controlling the liquid crystal molecules to have the pretilt.

14. A method of manufacturing a liquid crystal display, the method comprising:
forming a first alignment layer on a first substrate;
forming a second alignment layer on a second substrate;

forming a liquid crystal layer including liquid crystal molecules by injecting a liquid crystal material between the first substrate and the second substrate; and forming a first area and a second area in each of which the liquid crystal molecules of the liquid crystal layer are aligned to have a pretilt, wherein a pretilt angle of the liquid crystal molecules in the first area is larger than a pretilt angle of the liquid crystal molecules in the second area.

15. The method of claim 14, further comprising:
forming a light blocking member on the first substrate or the second substrate,
wherein the first area overlaps the light blocking member.

16. The method of claim 15, further comprising:
forming a gate line transmitting a gate signal and a data line transmitting a data voltage on the first substrate;
forming a pixel electrode receiving the data voltage in response to the gate signal on the first substrate; and
forming an opposing electrode on the second substrate.

17. The method of claim 16, wherein the forming of the first area and the second area comprises:
providing a prepolymer to at least one of the liquid crystal layer, the first alignment layer, and the second alignment layer;
forming the second area by polymerizing the prepolymer while providing a potential difference of a first voltage between the pixel electrode and the opposing electrode; and
forming the first area by polymerizing the prepolymer while providing a potential difference of 0V between the pixel electrode and the opposing electrode, and providing a potential difference of a second voltage between the data line and the opposing electrode.

18. The method of claim 17, wherein:
the second voltage is in a range from about 7V to about 30V.

19. The method of claim 17 wherein the prepolymer is polymerized by irradiation with light.

20. The method of claim 17 wherein the prepolymer is polymerized by application of heat.

21. The method of claim 16, wherein:
the forming of the first area and the second area comprises polymerizing the prepolymer while providing a potential difference of a third voltage applied to the opposing electrode with respect to the pixel electrode and a potential difference of a fourth voltage applied to the data line with respect to the opposing electrode.

22. The method of claim 21, wherein:
an absolute value of the fourth voltage is larger than an absolute value of the third voltage.

23. The method of claim 22, wherein:
the third voltage is in a range from about 7V to about 15V, and the fourth voltage is in a range from about −45V to—about 17V.

24. The method of claim 14, wherein:
the liquid crystal material further includes a prepolymer that can be polymerized by light.

25. The method of claim 14, wherein:
a long axis of the liquid crystal molecules in the first area forms an angle of about 10 degrees to about 89.5 degrees with respect to a normal line to surfaces of the first substrate and the second substrate.

* * * * *